United States Patent
Burnett et al.

(12)

(10) Patent No.: US 10,034,543 B1
(45) Date of Patent: Jul. 31, 2018

(54) FURNITURE UNIT

(71) Applicant: Sauder Woodworking Co., Archbold, OH (US)

(72) Inventors: Marvin K. Burnett, Archbold, OH (US); Mark A. Strayer, Lamar, MO (US)

(73) Assignee: SAUDER WOODWORKING CO., Archbold, OH (US)

( * ) Notice: Subject to any disclaimer, the term of this patent is extended or adjusted under 35 U.S.C. 154(b) by 0 days.

(21) Appl. No.: 15/407,921

(22) Filed: Jan. 17, 2017

(51) Int. Cl.
A47G 29/00 (2006.01)
A47B 43/00 (2006.01)
(Continued)

(52) U.S. Cl.
CPC ............ *A47B 47/06* (2013.01); *A47B 43/02* (2013.01); *A47B 55/06* (2013.01); *A47F 5/112* (2013.01);
(Continued)

(58) Field of Classification Search
CPC ....... A47B 47/06; A47B 43/02; A47B 47/042; A47B 55/06; A47B 61/06; A47B 96/021; A47B 96/02; A47B 43/00; A47B 57/58; A47B 57/588; A47B 96/04; A47B 47/0091; A47B 87/00; A47B 87/007; A47B 87/02; A47B 87/0207; A47B 87/0215; A47F 5/11; A47F 5/112; A47F 5/114; A47F 5/116; A47F 5/118; A47F 5/0018; A47F 5/0025; A47F 7/0028; A47F 5/005; A47F 7/144; A47F 5/132; A47F 5/10; A47F 5/108;
(Continued)

(56) References Cited

U.S. PATENT DOCUMENTS 2,144,318 A * 1/1939 Kryder .................. B65D 1/225
160/231.2
2,149,882 A * 3/1939 Clements ............... B21D 53/74
217/2
(Continued)

FOREIGN PATENT DOCUMENTS

CA 2367533 A1 7/2002

OTHER PUBLICATIONS

Sauder Item #401281 documentation, including: instruction book dated Jun. 16, 2006; part drawings dated Nov. 21 and 24, 2005; and miter-fold specification dated Jan. 18, 2006, 51 pages.
(Continued)

*Primary Examiner* — Jennifer E. Novosad
(74) *Attorney, Agent, or Firm* — Honigman Miller Schwartz and Cohn LLP; Douglas H. Siegel; Jonathan P. O'Brien

(57) ABSTRACT

A furniture unit includes at least one shelf. The shelf includes a substrate having an upper surface, a lower surface opposite the upper surface, a proximal peripheral surface, a distal peripheral surface, a first seam, and a second seam. The proximal peripheral surface extends from the upper surface to the lower surface. The distal peripheral surface is opposite the proximal peripheral surface and extends from the upper surface to the lower surface. The second seam is spaced apart from the first seam. The first and second seams extend in a direction parallel to the proximal peripheral surface. The proximal peripheral surface engages one of the distal peripheral surface, the upper surface, and the lower surface.

46 Claims, 8 Drawing Sheets

(51) Int. Cl.
*A47B 47/00* (2006.01)
*A47B 57/00* (2006.01)
*A47B 47/06* (2006.01)
*A47F 5/11* (2006.01)
*A47B 55/06* (2006.01)
*A47B 43/02* (2006.01)

(52) U.S. Cl.
CPC .... *Y10T 156/1051* (2015.01); *Y10T 156/1056* (2015.01)

(58) Field of Classification Search
CPC .......... B65D 5/005; B65D 5/504; B65D 1/36; B65D 5/0015; B65D 5/2038; B65D 5/22; B65D 5/48044; B65D 5/48024; Y10T 156/1064; Y10T 156/1051; B29C 2793/0054; B29C 53/36
USPC ........ 211/72, 195, 153, 188, 194, 135, 70.1, 211/126.16, 149; 248/174; 206/558, 206/561, 509; 229/120.06, 120.33, 229/120.34, 120.26, 120.02, 120.24, 229/120.29, 178, 915; 156/257, 227
See application file for complete search history.

(56) References Cited

U.S. PATENT DOCUMENTS

| | | | | |
|---|---|---|---|---|
| 2,768,043 A * | 10/1956 | Kristoff | .................. | B60N 3/002 108/10 |
| 2,993,603 A * | 7/1961 | Fohn | .................... | A47B 96/028 108/152 |
| 3,638,803 A | 2/1972 | MacMillan | | |
| 3,648,626 A * | 3/1972 | Schuster | ................ | A47B 45/00 108/42 |
| 3,649,398 A * | 3/1972 | Keith | .................... | B29C 53/063 138/149 |
| 3,675,808 A * | 7/1972 | Brink | .................... | B65D 1/225 206/509 |
| 3,698,329 A * | 10/1972 | Diamond | ............... | A47B 96/06 108/42 |
| 3,729,244 A * | 4/1973 | Butler | ..................... | A47B 3/12 108/115 |
| 3,863,575 A * | 2/1975 | Kuns | ...................... | A47B 43/02 108/179 |
| 3,881,794 A * | 5/1975 | Henning | .............. | A47B 96/202 217/65 |
| 3,952,672 A * | 4/1976 | Gordon | ............. | B65D 19/0012 108/51.3 |
| 4,099,472 A | 7/1978 | Kellogg | | |
| 4,325,597 A * | 4/1982 | Morrison | ............... | A47B 47/04 108/61 |
| 4,709,642 A * | 12/1987 | Briosi | .................. | A47B 47/025 108/187 |
| 4,759,295 A * | 7/1988 | Nilsen | ................. | B65D 19/0016 108/51.3 |
| 4,792,325 A * | 12/1988 | Schmidtke | ............... | B31D 5/00 108/51.3 |
| 4,867,074 A * | 9/1989 | Quasnick | ........... | B65D 19/0095 108/51.3 |
| 4,930,643 A | 6/1990 | Flum | | |
| 5,100,090 A * | 3/1992 | Drower | ................ | A47B 96/027 108/152 |
| 5,176,090 A * | 1/1993 | Roberts | .............. | B65D 19/0026 108/51.3 |
| 5,195,440 A * | 3/1993 | Gottlieb | ............. | B65D 19/0026 108/51.3 |
| 5,272,989 A * | 12/1993 | Johnston | ............ | B65D 19/0026 108/51.3 |
| 5,339,746 A * | 8/1994 | Vannatta | ............ | B65D 19/0012 108/51.3 |
| 5,377,600 A * | 1/1995 | Speese | ............... | B65D 19/0016 108/51.3 |
| 5,411,153 A | 5/1995 | Unfried | | |
| 5,413,834 A * | 5/1995 | Hunter | ................. | A47B 96/202 428/121 |
| 5,441,154 A * | 8/1995 | Youell, III | ......... | B65D 19/0026 108/51.3 |
| 5,562,048 A * | 10/1996 | Gottlieb | ............. | B65D 19/0012 108/51.3 |
| 5,682,936 A * | 11/1997 | Higdon, Jr. | ........ | A47B 88/9412 144/345 |
| 5,735,221 A * | 4/1998 | Benayon | .............. | A47B 47/024 108/107 |
| 5,809,903 A * | 9/1998 | Young, Jr. | .......... | B65D 19/0026 108/51.3 |
| 5,921,187 A * | 7/1999 | Wang | ................. | B65D 19/0016 108/51.3 |
| 5,950,546 A * | 9/1999 | Brown | ............... | B65D 19/0012 108/56.1 |
| 5,996,510 A * | 12/1999 | Harpman | ........... | B65D 19/0012 108/51.3 |
| 6,050,428 A * | 4/2000 | Hollander | ............ | A47B 96/021 211/135 |
| 6,135,033 A * | 10/2000 | Deferrari | ................ | A47F 5/116 108/165 |
| 6,520,353 B2 * | 2/2003 | Fulbright | ............. | A47B 96/028 108/108 |
| 7,028,964 B2 * | 4/2006 | Baechle | ............... | A47B 91/005 206/320 |
| 7,223,317 B2 | 5/2007 | Newberry et al. | | |
| 7,325,500 B2 * | 2/2008 | Carpenter | .............. | B65D 19/06 108/51.11 |
| 7,744,160 B2 * | 6/2010 | Stolarov | ............ | A47B 47/0008 108/157.14 |
| 7,891,507 B2 * | 2/2011 | Shetler | .................... | A47B 47/02 211/135 |
| 8,857,351 B2 * | 10/2014 | Zimmer | ................. | A47B 47/04 108/157.16 |
| 2006/0165248 A1 | 7/2006 | Butcher et al. | | |
| 2014/0291262 A1 * | 10/2014 | Choe | .................. | B32B 38/0012 211/42 |
| 2015/0305521 A1 * | 10/2015 | Volz | ....................... | A47F 5/118 211/135 |
| 2016/0088941 A1 * | 3/2016 | Snowbarger | ......... | A47B 96/021 211/135 |
| 2016/0198870 A1 * | 7/2016 | Volz | ....................... | A47F 5/116 211/135 |

OTHER PUBLICATIONS

Photos of birdhouse, publicly available prior to Jan. 17, 2016, 3 pages.
Mainstays Parsons End Table, believed to be publicly available before Jan. 17, 2017, 4 pages.

* cited by examiner

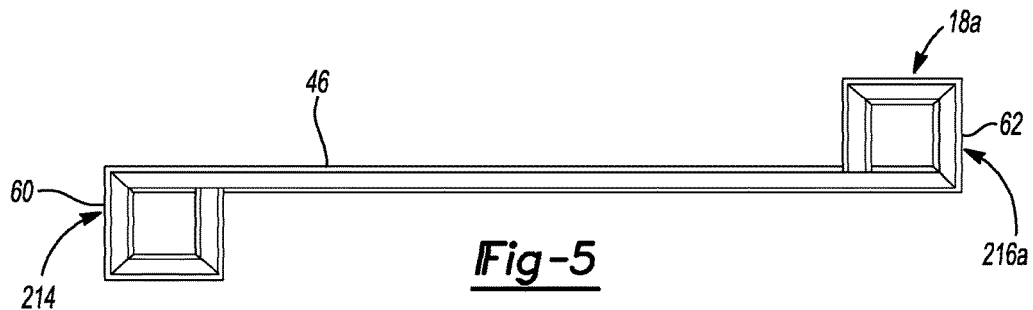
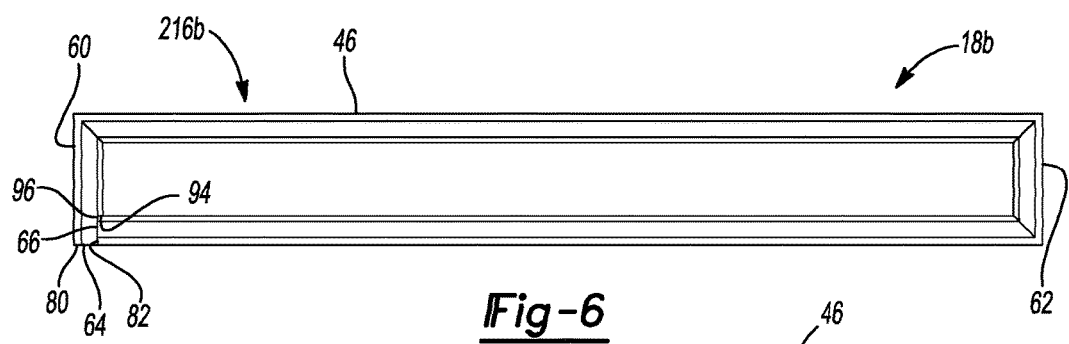
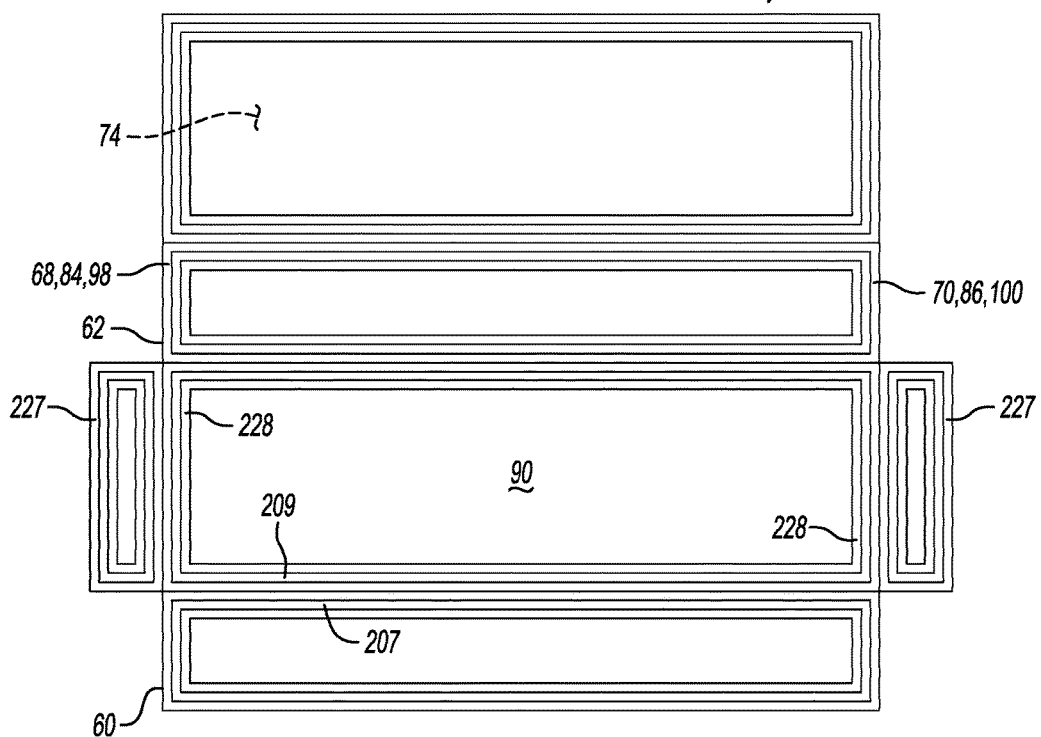

FURNITURE UNIT

FIELD

The present disclosure relates to a furniture unit having a folded construct.

BACKGROUND

This section provides background information related to the present disclosure and is not necessarily prior art.

Laminated substrates are often used to manufacture various types of furniture and fixtures for homes and offices. For example, countertops, drawer boxes, speaker boxes, and other items are often manufactured from wood, or a wood composite, having a polymer laminate.

While known furniture and known furniture manufacturing methods have proven useful for their intended purposes, a need for continuous improvement in the pertinent art remains.

SUMMARY

This section provides a general summary of the disclosure, and is not a comprehensive disclosure of its full scope or all of its features.

One aspect of the disclosure provides a furniture unit. The furniture unit may include at least one shelf. The shelf may include a substrate having a proximal portion, a distal portion, an upper surface, a lower surface opposite the upper surface, a proximal peripheral surface, and a distal peripheral surface. The proximal peripheral surface may be disposed in the proximal portion and may extend from the upper surface to the lower surface. The distal peripheral surface may be disposed in the distal portion opposite the proximal peripheral surface and may extend from the upper surface to the lower surface. The proximal portion may include a first seam and a second seam spaced apart from the first seam. The first and second seams may extend in a direction parallel to the proximal peripheral surface. The proximal peripheral surface may engage one of the upper surface and the lower surface.

Implementations of the disclosure may include one or more of the following optional features. In some implementations, at least one of the first seam and the second seam is defined by a first channel wall and a second channel wall. The first channel wall and the second channel wall may define a common edge. The first channel wall may engage the second channel wall.

In some implementations, the first and second seams extend from the upper surface, and the proximal peripheral surface engages the upper surface.

In some implementations, the distal portion includes a third seam and a fourth seam spaced apart from the third seam. The third and fourth seams may extend in a direction parallel to the distal peripheral surface. The distal peripheral surface may engage one of the upper surface and the lower surface. The first and second seams may extend from the upper surface, and the third and fourth seams extend from the lower surface. The proximal peripheral surface may engage the upper surface and the distal peripheral surface may engage the lower surface.

In some implementations, the first, second, third, and fourth seams are defined by first, second, third, and fourth channels, respectively, formed in the upper surface. The proximal and distal peripheral surfaces may engage the upper surface. In some implementations, a forward portion of the upper surface engages a rearward portion of the upper surface.

In some implementations, the proximal portion forms a hollow support portion. The hollow support portion may define a polygonal cross section. The polygonal cross section may define a square.

In some implementations, the upper surface includes a first portion and a second portion. The first portion may extend between the proximal peripheral surface and the first seam. The second portion may extend between the first seam and the second seam. The first portion and the second portion may define an angle therebetween. The angle may be between about fifteen degrees and about sixty degrees. In some implementations, the angle is equal to ninety degrees.

In some implementations, the proximal peripheral surface defines an angle between about fifteen degrees and about sixty degrees relative to the one of the upper surface and the lower surface.

In some implementations, the proximal peripheral surface defines an angle substantially equal to ninety degrees relative to the one of the upper surface and the lower surface.

In some implementations, the substrate includes a lateral peripheral surface and a medial peripheral surface opposite the lateral peripheral surface. The lateral and medial peripheral surfaces may each extend from the upper surface to the lower surface. The first and second seam may each extend from the lateral peripheral surface to the medial peripheral surface.

In some implementations, the substrate includes a base material and a laminate material. The base material may define one of the upper surface and the lower surface. The laminate material may define the other of the upper surface and the lower surface. At least one of the first seam and the second seam may be define by a channel formed in the base material.

In some implementations, the laminate material includes a first fold and a second fold. The first fold may be aligned with the first seam. The second fold may be aligned with the second seam.

In some implementations, the laminate material is a paper material. The base material may be one of a medium-density fiberboard and a particle board.

In some implementations, the furniture unit includes a first lateral leg, a first medial leg, a second lateral leg, and a second medial leg. The at least one shelf may include a first shelf and a second shelf. The first lateral leg and the first medial leg may support the first shelf. The second lateral leg and the second medial leg may support the second shelf.

In some implementations, the first lateral leg is removably coupled to the second lateral leg, and the first medial leg is removably coupled to the second medial leg.

In some implementations, the furniture unit includes a connector removably coupled to the first lateral leg and to the second lateral leg.

Another aspect of the disclosure provides a method of manufacturing a furniture unit from a substrate. The method may include forming a first channel and a second channel adjacent a proximal end of the substrate. The method may also include folding the substrate in a first direction at the first and second channels to form a hollow proximal support portion.

In some implementations, the method includes forming a third channel and a fourth channel adjacent a distal end of the substrate, and folding the substrate in the first direction at the third and fourth channels to form a hollow distal support portion.

In some implementations, the substrate includes an upper surface and a lower surface. The first and second channels may be formed in the upper surface of the substrate. The third and fourth channels may be formed in the lower surface of the substrate. The lower surface of the substrate may be opposite the upper surface of the substrate.

In some implementations, the substrate includes an upper surface. The first, second, third, and fourth channels may be formed in the upper surface of the substrate.

In some implementations, the substrate includes a base layer and at least one laminate layer. The first and second channels may be formed in the base layer. The folding step may result in a first fold and a second fold formed in the at least one laminate layer. In some implementations, the first fold is aligned with the first channel, and the second fold is aligned with the second channel.

In some implementations, the at least one laminate layer includes an upper laminate layer disposed on an upper surface of the base layer, and a lower laminate layer disposed on a lower surface of the base layer. The lower surface of the base layer may be opposite the upper surface of the base layer. The first and second channels may extend through the upper laminate layer and the third and fourth channels may extend through the lower laminate layer.

In some implementations, the method includes removing a portion of at least one of the at least one laminate layer to expose a portion of the base layer. The method may also include engaging the proximal end of the substrate with the exposed portion of the base layer.

In some implementations, forming the first and second channels includes miter cutting through a portion of the substrate.

In some implementations, the method includes forming a third channel and a fourth channel in the substrate. The method may also include folding the substrate in a second direction at the third and fourth channels to form a hollow distal support portion. The second direction may be opposite to the first direction. In some implementations, the first direction is counterclockwise and the second direction is clockwise.

The details of one or more implementations of the disclosure are set forth in the accompanying drawings and the description below. Other aspects, features, and advantages will be apparent from the description and drawings, and from the claims.

DRAWINGS

The drawings described herein are for illustrative purposes only of selected configurations and are not intended to limit the scope of the present disclosure.

FIG. 5 is an end view of a shelf for use with the furniture unit of FIG. 1;

FIG. 6 is an end view of a shelf for use with the furniture unit of FIG. 1;

FIG. 7A is a top view of a substrate prior to forming a shelf for use with the furniture unit of FIG. 1;

Corresponding reference numerals indicate corresponding parts throughout the drawings.

DETAILED DESCRIPTION

Figure 1:
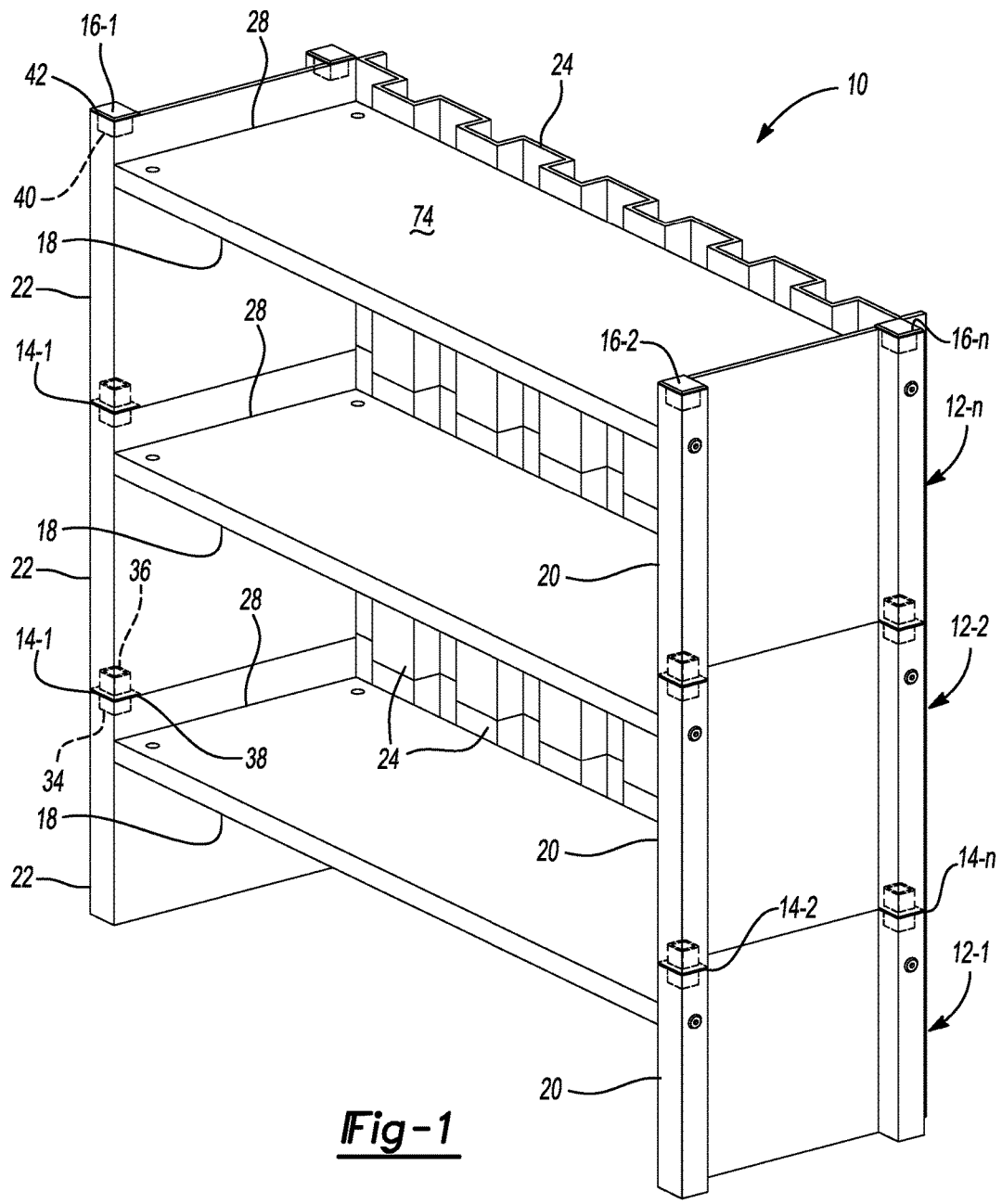
FIG. 1 is a perspective view of a furniture unit in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 2:
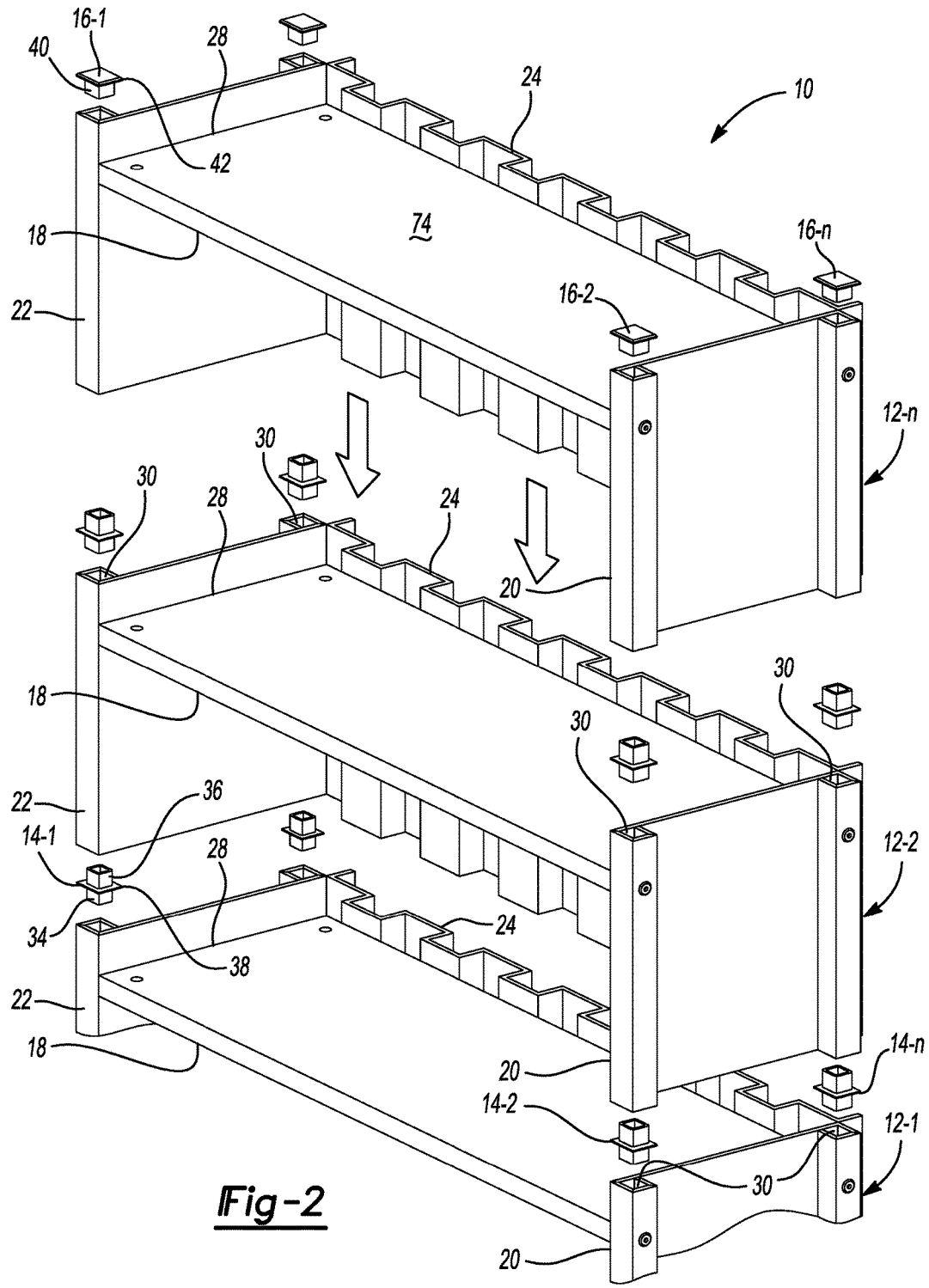
FIG. 2 is an exploded view of the furniture unit of FIG. 1.
Figure 3:
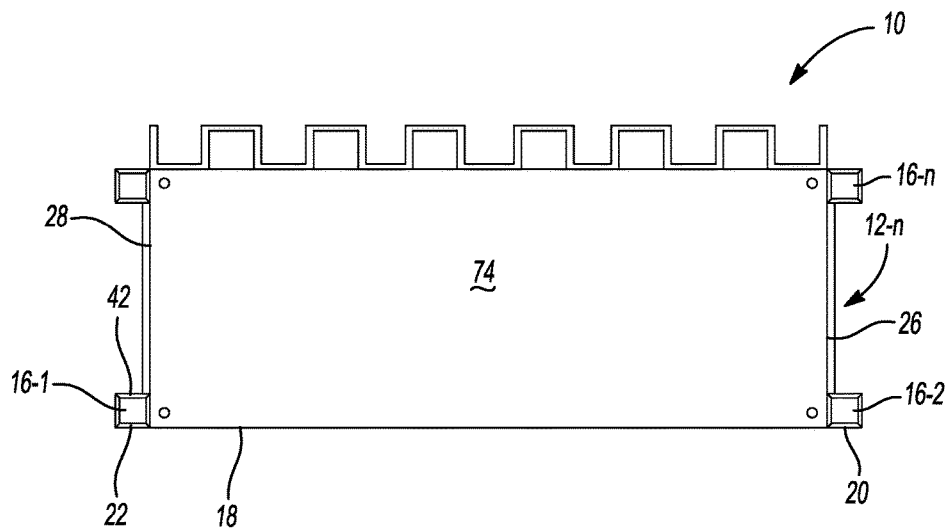
FIG. 3 is a top view of the furniture unit of FIG. 1.

With reference to FIGS. 1-3, a furniture unit 10 is provided. While the furniture unit 10 is generally shown and described herein as being a bookcase, it will be appreciated that the furniture unit 10 may include other types of home or office furniture or fixtures (e.g., tables, bed frames, desks, etc.) within the scope of the present disclosure.

The furniture unit 10 may include one or more shelf sections 12-1, 12-2, . . . 12-*n*, one or more connectors 14-1, 14-2, . . . 14-*n*, and one or more caps 16-1, 16-2, . . . 16-*n*. Each shelf section 12-1, 12-2, . . . 12-*n* may include a shelf 18, a lateral leg 20, a medial leg 22, and a backer 24. The shelf 18 may extend from a lateral end 26 to a medial end 28 opposite the lateral end 26. The lateral leg 20 may be coupled to, or otherwise supported by, the lateral end 26 of the shelf 18. The medial leg 22 may be coupled to, or otherwise supported by, the medial end 28 of the shelf 18. As illustrated in FIG. 3, the backer 24 may be coupled to, or otherwise supported by, the shelf 18, the lateral leg 20, and/or the medial leg 22.

As illustrated in FIG. 2, the lateral and medial legs 20, 22 may each define a substantially hollow construct having upper and lower openings 30, 32. The upper and lower openings 30, 32 may define any of a variety of shapes. For example, while the upper and lower openings 30, 32 are generally illustrated as defining rectangular (e.g., square) shapes, it will be appreciated that the upper and lower openings may define another shape such as a triangle, a circle, or another polygon within the scope of the present disclosure. In some implementations, the lateral and/or medial leg 20, 22 may include the shelf 18, or a construct substantially similar thereto. For example, the lateral leg 20 may define another shelf, substantially similar or identical to shelf 18, supported by the lateral end 26 of the shelf 18, and the medial leg 22 may define another shelf, substantially similar or identical to shelf 18, supported by the medial end 28 of the shelf 18.

With further reference to FIG. 2, the connectors 14-1, 14-2, . . . 14-*n* may each include a first coupling portion 34, a second coupling portion 36, and a stop portion 38. The first and second coupling portions 34, 36 may define any of a variety of shapes. For example, while the first and second coupling portions 34, 36 are generally illustrated as defining rectangular (e.g., square) shapes, it will be appreciated that the first and second coupling portions 34, 36 may each define another shape such as a triangle, a circle, or another polygon within the scope of the present disclosure. In this regard, the size and shape of the first and second coupling portions 34, 36 may correspond to the size and shape of one or both of the upper or lower openings 30, 32 of the lateral and medial legs 20, 22, such that the upper or lower openings 30, 32 can receive the first or second coupling portions 34, 36 of the connectors 14-1, 14-2, . . . 14-*n* in an assembled configuration, as described in more detail below.

The stop portion 38 may extend outwardly from, or otherwise relative to, the first or second coupling portions 34, 36 of the connectors 14-1, 14-2, . . . 14-*n*. In some implementations, the stop portion 38 defines an outwardly extending flange relative to the first and second coupling portions 34, 36. In this regard, the stop portion 38 may define a shape that is substantially similar to the shape defined by the first or second coupling portions 34, 36.

The caps 16-1, 16-2, . . . 16-*n* may each include a coupling portion 40 and a stop portion 42. The coupling portion 40 may define any of a variety of shapes. For example, while the coupling portion 40 is generally illustrated as defining a rectangular (e.g., square) shape, it will be appreciated that the coupling portion 40 may define another shape such as a triangle, a circle, or another polygon within the scope of the present disclosure. In this regard, the size and shape of the coupling portion 40 may correspond to the size and shape of one or both of the upper or lower openings 30, 32 of the lateral and medial legs 20, 22, such that the upper or lower openings 30, 32 can receive the coupling portion 40 of the caps 16-1, 16-2, . . . 16-*n* in an assembled configuration, as described in more detail below. The stop portion 42 may extend outwardly from, or otherwise relative to, the coupling portion 40 of the caps 16-1, 16-2, . . . 16-*n*. In some implementations, the stop portion 42 defines an outwardly extending flange at, and relative to, an uppermost portion of the coupling portion 40. In this regard, the stop portion 42 may define a shape that is substantially similar to the shape defined by the coupling portion 42.

As illustrated in FIGS. 1 and 2, in the assembled configuration, the shelf sections 12-1, 12-2, . . . 12-*n* may be arranged in a stacked configuration. In this regard, the lateral leg 20 of the first shelf section 12-1 may be removably coupled to the lateral leg 20 of the second shelf section 12-2, and the medial leg 22 of the first shelf section 12-1 may be removably coupled to the medial leg 22 of the second shelf section 12-2. For example, one or more connectors 14-1, 14-2, . . . 14-*n* may be removably coupled to the lateral leg 20 of the first shelf section 12-1 and to the lateral leg 20 of the second shelf section 12-1, and another one or more connectors 14-1, 14-2, . . . 14-*n* may be removably coupled to the medial leg 22 of the first shelf section 12-1 and to the medial leg 22 of the second shelf section 12-1. In particular, the first coupling portion 34 of one or more of the connectors 14-1, 14-2, . . . 14-*n* may be disposed within one or more of the upper openings 30 of the lateral leg 20 of the first shelf section 12-1, and the second coupling portion 36 may be disposed within one or more of the lower openings 32 of the lateral leg 20 of the second shelf section 12-2, such that the stop portion 38 engages the lateral legs 20 of the first and second shelf sections 12-1, 12-2. Similarly, the first coupling portion 34 of one or more of the connectors 14-1, 14-2, . . . 14-*n* may be disposed within one or more of the upper openings 30 of the medial leg 22 of the first shelf section 12-1, and the second coupling portion 36 may be disposed within one or more of the lower openings 32 of the medial leg 22 of the second shelf section 12-2, such that the stop portion 38 engages the medial legs 22 of the first and second shelf sections 12-1, 12-2.

Figure 4A:
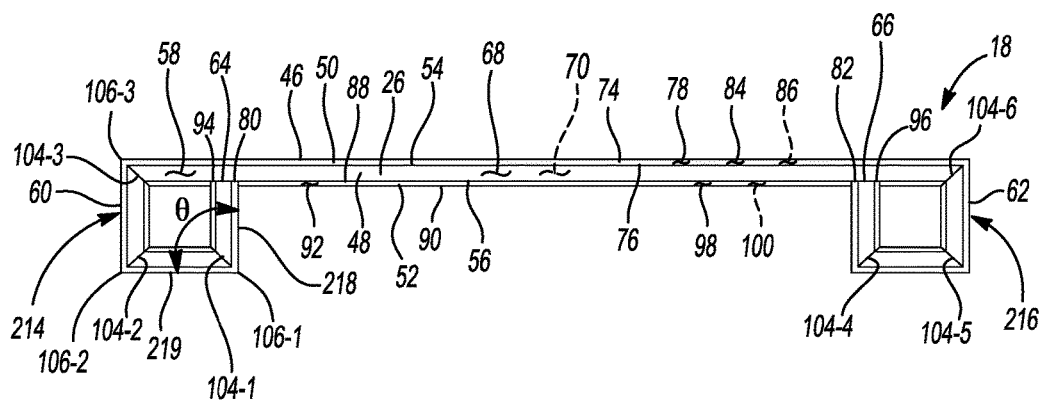
FIG. 4A is an end view of a shelf for use with the furniture unit of FIG. 1.
Figure 4B:
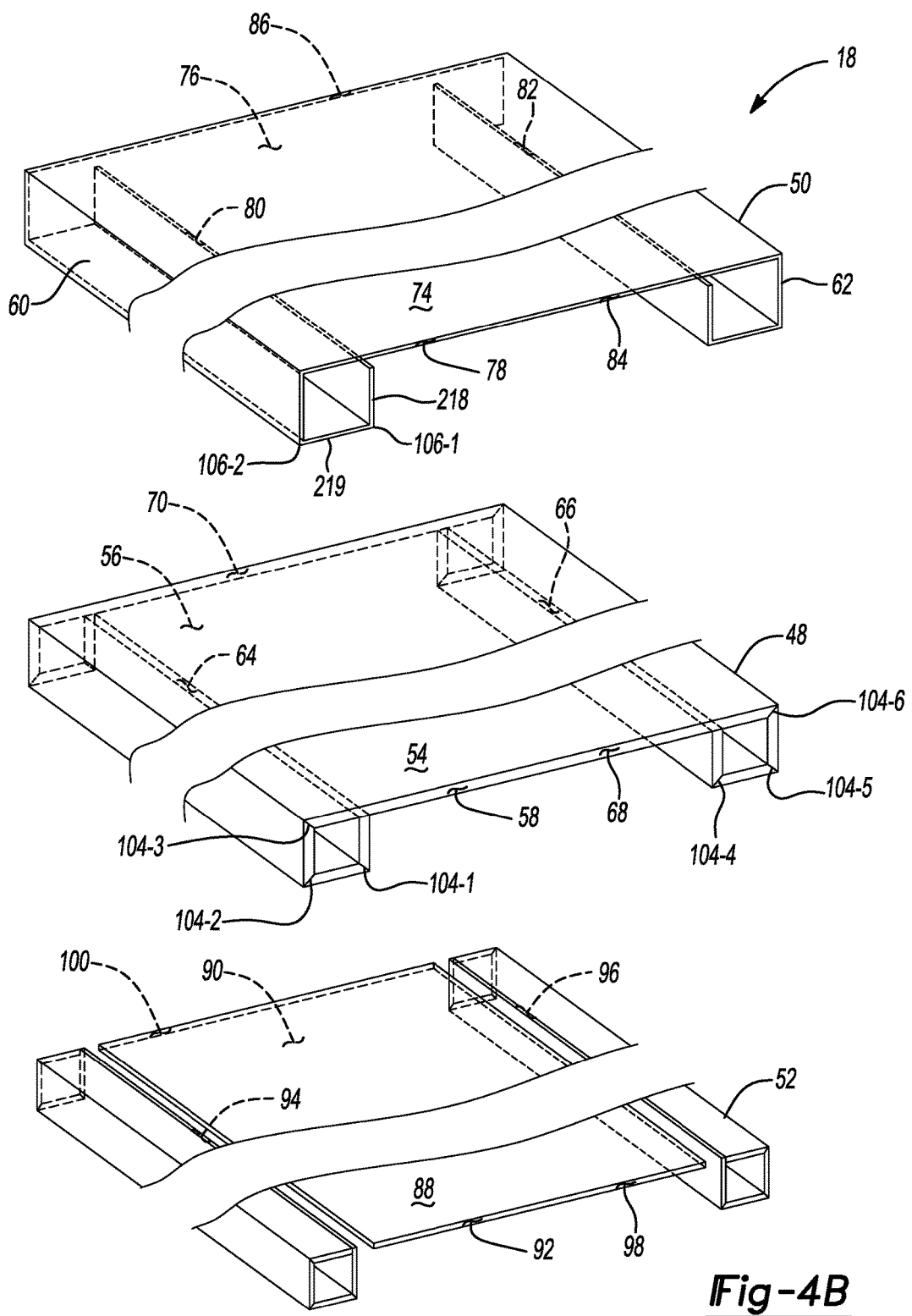
FIG. 4B is an exploded view of the shelf of FIG. 4A.

With reference to FIGS. 4A and 4B, the shelf 18 may include, or otherwise be formed from, a substrate 46 having a layered construct. In this regard, the substrate 46 may include a base layer 48, an upper laminate layer 50, and a lower laminate layer 52. The base layer 48 and the upper and lower laminate layers 50, 52 may each be formed from one or more of a variety of materials. In some implementations, the base layer 48 is formed from a medium-density fiberboard material, a polymer material (e.g., polyvinyl chloride), or a particle board material, and the laminate layers 50, 52 are formed from a paper material or a polymer material (e.g., polypropylene).

The base layer 48 may include an upper surface 54, a lower surface 56 opposite the upper surface 54, and a peripheral surface 58. The upper and lower surfaces 54, 56 may extend from a proximal portion 60 of the substrate 46 to a distal portion 62 of the substrate 46. The peripheral surface 58 may extend from the upper surface 54 to the lower surface 56. In this regard, the peripheral surface 58 may include a proximal peripheral surface 64, a distal peripheral surface 66, a lateral peripheral surface 68, and a medial peripheral surface 70. The proximal peripheral surface 64 may be disposed in the proximal portion 60 of the substrate 46. The distal peripheral surface 66 may be disposed in the distal portion 62 of the substrate 46 opposite the proximal peripheral surface 64. The lateral peripheral surface 68 may extend from the proximal peripheral surface 64 to the distal peripheral surface 66. The medial peripheral surface 70 may extend from the proximal peripheral surface 64 to the distal peripheral surface 66 opposite the lateral peripheral surface 68.

The upper laminate layer 50 may include an upper surface 74, a lower surface 76 opposite the upper surface 74, and a peripheral surface 78. The upper and lower surfaces 74, 76 may extend from the proximal portion 60 of the substrate 46 to the distal portion 62 of the substrate 46. The peripheral surface 78 may extend from the upper surface 74 to the lower surface 76. In this regard, the peripheral surface 78 may include a proximal peripheral surface 80, a distal peripheral surface 82, a lateral peripheral surface 84, and a medial peripheral surface 86. The proximal peripheral surface 80 may be disposed in the proximal portion 60 of the substrate 46. The distal peripheral surface 82 may be disposed in the distal portion 62 of the substrate 46 opposite the proximal peripheral surface 80. The lateral peripheral surface 84 may extend from the proximal peripheral surface 80 to the distal peripheral surface 82. The medial peripheral surface 86 may extend from the proximal peripheral surface 80 to the distal peripheral surface 82 opposite the lateral peripheral surface 84.

The lower laminate layer 52 may include an upper surface 88, a lower surface 90 opposite the upper surface 88, and a peripheral surface 92. The upper and lower surfaces 88, 90 may extend from the proximal portion 60 of the substrate 46 to the distal portion 62 of the substrate 46. The peripheral surface 92 may extend from the upper surface 88 to the lower surface 90. In this regard, the peripheral surface 92 may include a proximal peripheral surface 94, a distal peripheral surface 96, a lateral peripheral surface 98, and a medial peripheral surface 100. The proximal peripheral surface 94 may be disposed in the proximal portion 60 of the substrate 46. The distal peripheral surface 96 may be disposed in the distal portion 62 of the substrate 46 opposite the proximal peripheral surface 94. The lateral peripheral surface 98 may extend from the proximal peripheral surface 94 to the distal peripheral surface 96. The medial peripheral surface 100 may extend from the proximal peripheral surface 94 to the distal peripheral surface 96 opposite the lateral peripheral surface 98.

In the assembled configuration, the upper surface 54 of the base layer 48 may engage the lower surface 76 of the upper laminate layer 50, and the lower surface 56 of the base layer 48 may engage the upper surface 88 of the lower laminate layer 52, such that the upper surface 74 of the upper laminate layer 50, the lower surface 90 of the lower laminate layer 52, the peripheral surface 58 of base layer 48, the peripheral surface 78 upper laminate layer 50, and the peripheral surface 92 of lower laminate layer 52 define outermost surfaces of the substrate 46. In some implementations, the upper surface 54 of the base layer 48 may be bonded to the lower surface 76 of the upper laminate layer 50 using an adhesive or other suitable technique, and the lower surface 56 of the base layer 48 may be bonded to the upper surface 88 of the lower laminate layer 52 using an adhesive or other suitable technique. While the substrate 46 is generally shown and described herein as including the base layer 48, the upper laminate layer 50, and the lower laminate layer 52, the substrate 46 may include the base layer 48 and one of the upper and lower laminate layers 50, 52 within the scope of the present disclosure. In this regard, in some implementations, the upper surface 54 or the lower surface 56 of the base layer 48 may define an outermost surface of the substrate 46.

As illustrated in FIG. 4A, the shelf 18 may include, or otherwise define, a first seam 104-1, a second seam 104-2 spaced apart from the first seam 104-1, and a third seam 104-3 spaced apart from the first and second seams 104-1, 104-2. It will be appreciated that the shelf 18 may include more or less than three seams within the scope of the present disclosure. For example, as illustrated in FIG. 4A, in some implementations, the shelf 18 may include first, second and third seams 104-1, 104-2, 104-3 in the proximal portion 60 of the substrate 46, and fourth, fifth, and sixth seams 104-4, 104-5, 104-6 in the distal portion 62 of the substrate 46. The seams 104-1, 104-2, 104-3 may extend through the base layer 48. Where the substrate 46 includes the base layer 48 and both of the upper and lower laminate layers 50, 52, the seams 104-1, 104-2, 104-3 may extend through the base layer 48 and through one of the upper and lower laminate layers 50, 52. Where the substrate 46 includes the base layer 48 and one of the upper and lower laminate layers 50, 52, the seams 104-1, 104-2, 104-3 may extend through only the base layer 48. The seams 104-1, 104-2, . . . 104-$n$ may extend from the lateral peripheral surfaces 68, 84, 98 to the medial peripheral surfaces 70, 86, 100. In this regard, the seams 104-1, 104-2, 104-3 may extend in a direction substantially parallel (+/−5 degrees) to the proximal peripheral surfaces 64, 80, 94 or the distal peripheral surfaces 66, 82, 96.

With continued reference to FIGS. 4A and 4B, the shelf 18 may further include, or otherwise define, a first fold 106-1, a second fold 106-2 spaced apart from the first fold 106-1, and a third fold 106-3 spaced apart from the first and second folds 106-1, 106-2. It will be appreciated that the shelf 18 may include more or less than three folds within the scope of the present disclosure. In this regard, the number "n" of folds 106-1, 106-2, . . . 106-$n$ may equal the number of seams 104-1, 104-2, . . . 104-$n$. Where the substrate 46 includes the base layer 48 and both of the upper and lower laminate layers 50, 52, the folds 106-1, 106-2, 106-3 may be formed in the one of the upper and lower laminate layers 50, 52 which does not include the seams 104-1, 104-2, 104-3. Where the substrate 46 includes the base layer 48 and one of the upper and lower laminate layers 50, 52, the folds 106-1, 106-2, 106-3 may be formed in that one of the upper and lower laminate layers 50, 52. The folds 106-1, 106-2, 106-3 may extend from the lateral peripheral surfaces 68, 84, 98 to the medial peripheral surfaces 70, 86, 100. In some implementations, the folds 106-1, 106-2, 106-3 extend in a direction substantially parallel (+/−5 degrees) to the proximal peripheral surfaces 64, 80, 94 or the distal peripheral surfaces 66, 82, 96. In this regard, each fold 106-1, 106-2, . . . 106-$n$ may be aligned with one of the seams 104-1, 104-2, . . . 104-$n$.

With reference to FIGS. 4 and 10A-10D, a method of manufacturing any component of shelf section 12-1, 12-2, . . . 12-n (i.e, shelf 18, lateral leg 20, medial leg 22, and backer 24) of the furniture unit 10 will now be described. The component of shelf section 12-1, 12-2, . . . 12-n may be manufactured from the substrate 46 having a thickness T extending between an upper surface (e.g., upper surface 74) and a lower surface (e.g., lower surface 90). The thickness T may be between two millimeters and ten millimeters. In some implementations, the thickness T may be substantially equal to five millimeters.

Figure 10A:
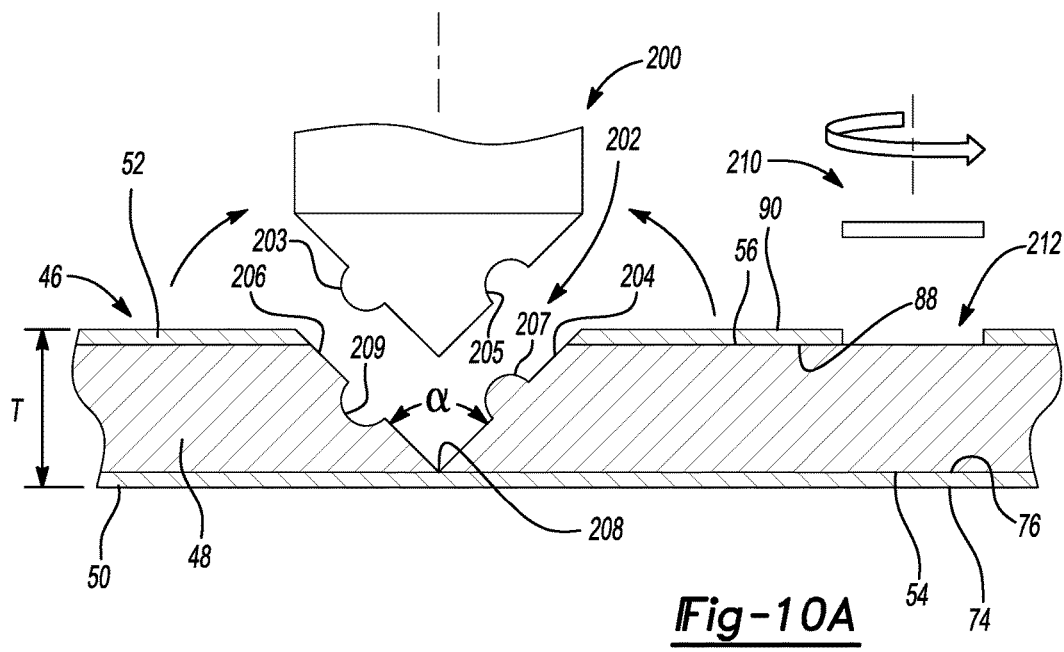
FIG. 10A is cross-sectional view of a substrate during a method of manufacturing the furniture unit of FIG. 1.

With particular reference to FIG. 10A, the method may include providing a tool 200 (e.g., a router, a blade, a bit, etc.) and using the tool to form a plurality of primary channels 202 in the substrate 46, e.g, by miter cutting the plurality of primary channels 202 in the substrate 46. In this regard, the number and location of the primary channels 202 may correspond to the number and location of the seams 104-1, 104-2, . . . 104-n or the number and location of the folds 106-1, 106-2, . . . 106-n. The tool 200 may include a male portion 203 and a female portion 205 opposite the male portion 203. As illustrated, in some configurations, the male portion 203 defines a convex profile and the female portion 205 defines a concave profile. It will be appreciated, however, that the male and female portions 203, 205 may define other profiles (e.g., triangular, rectangular, etc.) within the scope of the present disclosure. In this regard, the size and shape of the male portion 203 may correspond to, or otherwise be the same as, the size and shape of the female portion 205. Accordingly, as illustrated in FIG. 10A, the primary channels 202 may be defined by a first channel wall 204 having a male portion 207 formed by the female portion 205 of the tool 200, and a second channel wall 206 having a female portion 209 formed by the male portion 203 of the tool 200.

The first and second channel walls 204, 206 may extend through a majority of the thickness T of the substrate 46. For example, the first and second channel walls 204, 206 may extend through between approximately seventy percent of the thickness T of the substrate 46 and ninety-nine percent of the thickness T of the substrate 46. In some implementations, the first and second channel walls 204, 206 may extend through an entirety of the base layer 48 and through an entirety of the lower laminate layer 52. In this regard, the first and second channels walls 204, 206 may define a common edge 208 adjacent the lower surface 76 of upper laminate layer 50, and have an angle α therebetween. The angle α may be between about fifteen degrees and about one hundred sixty-five degrees. As illustrated in FIG. 10A, in some implementations, the angle α is substantially equal to ninety degrees.

With continued reference to FIG. 10A, the method may further include providing a tool 210 and forming one or more secondary channels 212 in the substrate 46. As illustrated in FIG. 10A, the secondary channels 212 may extend through the lower laminate layer 52 to expose the lower surface 56 of the base layer 48. In this regard, forming the secondary channels 212 may include removing a portion of the lower laminate layer 52. The secondary channels 212 may extend from the lateral peripheral surfaces 68, 84, 98 to the medial peripheral surfaces 70, 86, 100.

Figure 10B:
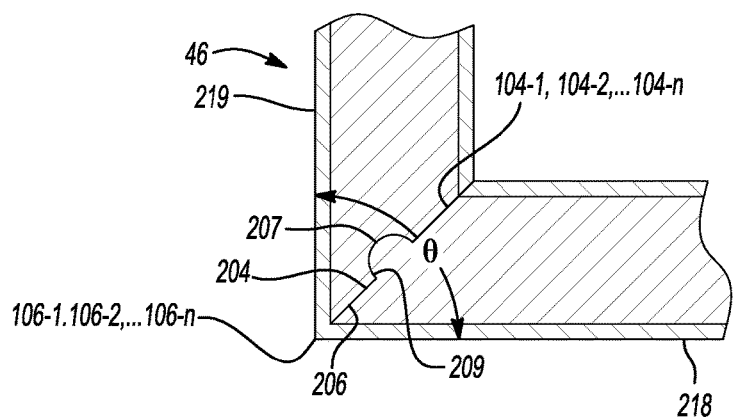
FIG. 10B is cross-sectional view of a substrate during a method of manufacturing the furniture unit of FIG. 1.

With reference to FIG. 10B, the method may also include folding the substrate 46 such that each first channel wall 204 of primary channel 202 engages the second channel wall 206 of the same of primary channel 202 to define a corresponding seam 104-n and fold 106-n. In this regard, the female portion 209 of each primary channel 202 may receive the male portion 207 of such primary channel 202. For example, the method may include performing a plurality of folding operations to define the plurality of seams 104-1, 104-2, . . . 104-n and the plurality of folds 106-1, 106-2, . . . 106-n. In this regard, each fold 106-1, 106-2, . . . 106-n may define, or otherwise act as, a hinge for folding the substrate 46. Accordingly each fold 106-1, 106-2, . . . 106-n may be referred to herein as a hinge 106-1, 106-2, . . . 106-n. As illustrated in FIGS. 4A and 4B, in some implementations, the folding operations, and the plurality of seams 104-1, 104-2, . . . 104-n and the plurality of folds 106-1, 106-2, . . . 106-n defined thereby, forms a hollow proximal support 214 at the proximal portion 60 of the substrate 46 and a hollow distal support 216 at the distal portion 62 of the substrate 46. The hollow proximal support 214 and/or the hollow distal support 216 may define a polygonal cross section extending from the lateral peripheral surfaces 68, 84, 98 to the medial peripheral surfaces 70, 86, 100. For example, the hollow proximal support 214 and the hollow distal support 216 may define a rectangular (e.g., square) cross section extending from the lateral peripheral surfaces 68, 84, 98 to the medial peripheral surfaces 70, 86, 100. In this regard, the upper surface 74 of the upper laminate layer 50 may include a first portion 218 and a second portion 219. The first portion 218 may extend from the proximal peripheral surface 80 to a first seam 104-1, and the second portion 219 may extend from the first seam 104-1 to a second seam 104-2. The first portion 218 and the second portion 219 may define an angle θ therebetween. The angle θ may be between about fifteen degrees and about one hundred sixty-five degrees. As illustrated in FIGS. 4 and 10B, in some implementations, the angle θ is substantially equal to ninety degrees.

Figure 10C:
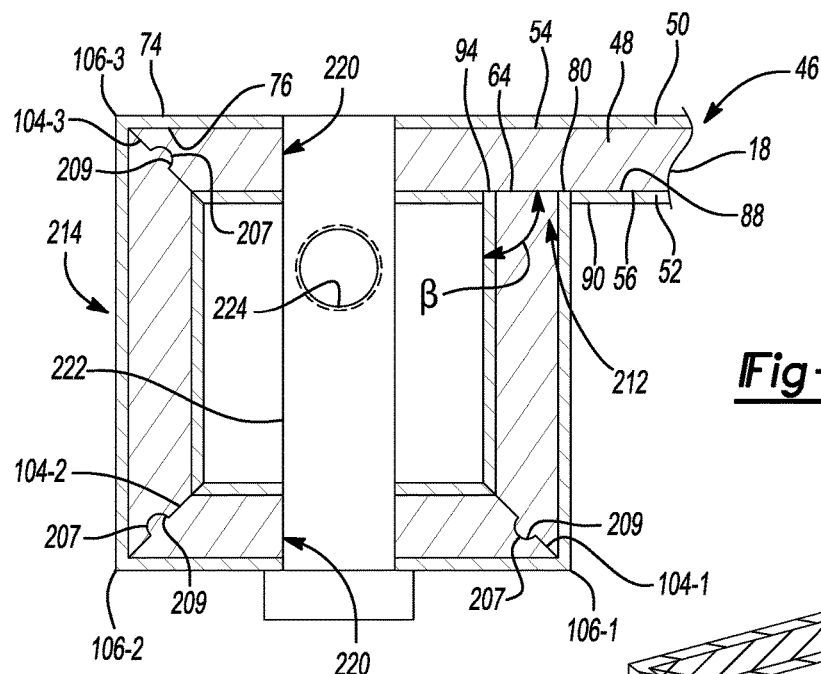
FIG. 10C is cross-sectional view of a substrate during a method of manufacturing the furniture unit of FIG. 1.

With reference to FIG. 10C, folding the substrate 46 may also include engaging the proximal peripheral surfaces 64, 80, or 94 or the distal peripheral surfaces 66, 82, or 96 with the upper surface 54 of the base layer 48 or with the lower surface 56 of the base layer 48. In particular, folding the substrate 46 may include positioning the proximal peripheral surfaces 64, 80, 94 or the distal peripheral surfaces 66, 82, 96 within one of the secondary channels 212 such that the proximal peripheral surfaces 64, 80, 94 or the distal peripheral surfaces 66, 82, 96 engage the upper surface 54 or the lower surface 56 of the base layer 48. In this regard, the proximal peripheral surfaces 64, 80, 94 or the distal peripheral surfaces 66, 82, 96 may define an angle β relative to one or more of the upper surfaces 54, 74, 88 or the lower surfaces 56, 76, 90. For example, the proximal peripheral surfaces 64, 80, 94 or the distal peripheral surfaces 66, 82, 96 may define an angle β relative to the lower surface 90. The angle β may be between about ninety degrees and about one hundred eighty degrees. For example, if the hollow support portion 214 defines a rectangle the angle β may be substantially equal to ninety degrees. If the hollow support portion 214 defines a triangle the angle β may be greater than ninety degrees. In some implementations, if the hollow support portion 214 defines a triangle, the angle β may be substantially equal to one hundred twenty degrees.

In some implementations, engaging the proximal peripheral surfaces 64, 80, or 94 or the distal peripheral surfaces 66, 82, or 96 with the upper surface 54 of the base layer 48 or with the lower surface 56 of the base layer 48 may also include coupling the proximal peripheral surfaces 64, 80, or 94 or the distal peripheral surfaces 66, 82, or 96 with the upper surface 54 of the base layer 48 or with the lower surface 56 of the base layer 48 using an adhesive or other suitable technique.

As illustrated in FIGS. 4A and 4B, in some implementations, folding the substrate 46 to form the hollow proximal support 214 and/or the hollow distal support 216 includes folding the proximal portion 60 in a counterclockwise direction and folding the distal portion 62 in a clockwise direction.

With continued reference to FIG. 10C, the method may also include forming one or more apertures 220 through the substrate 46 and placing a primary connector 222 in each of the one or more apertures 220. For example, the method may include forming the one or more apertures 220 through the hollow proximal support 214 or the hollow distal support 216. The primary connector 222 may include a cross-dowel having an aperture 224 formed therein.

Figure 10D:
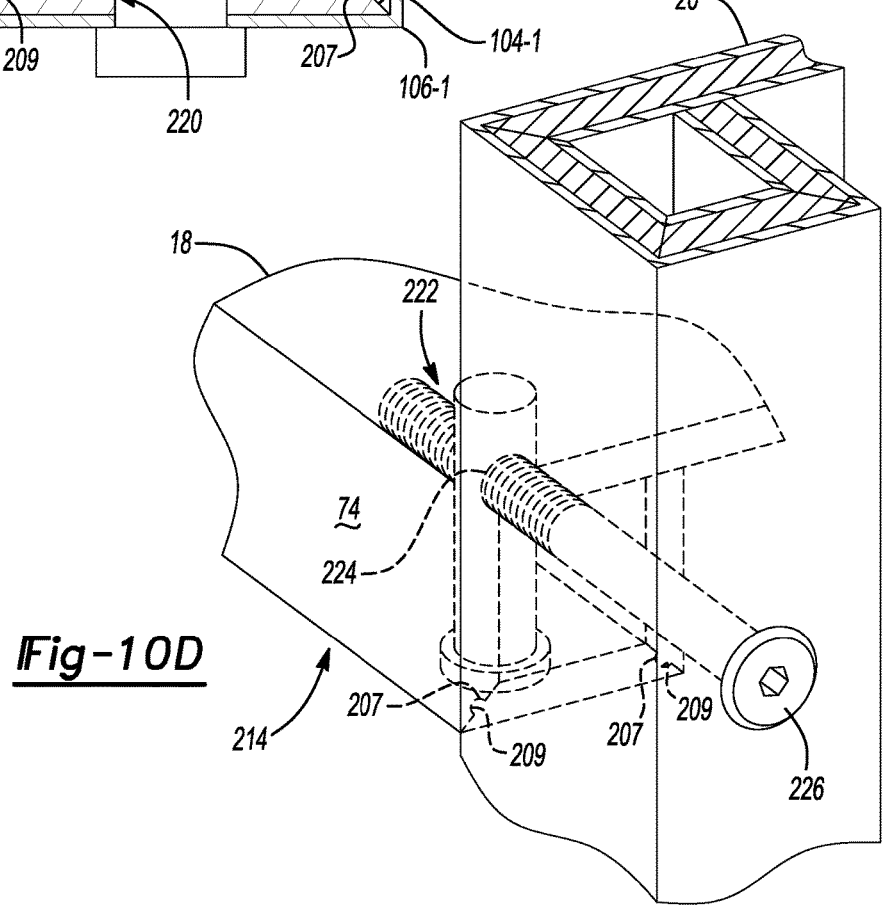
FIG. 10D is cross-sectional view of a substrate during a method of manufacturing the furniture unit of FIG. 1.

With reference to FIG. 10D, the method may further include coupling the shelf 18 to the lateral leg 20 or the medial leg 22. In some implementations, the method may include coupling a secondary connector 226 to each of the primary connectors 222 to couple the shelf 18 to the lateral leg 20 and the medial leg 22. For example, the method may include extending the secondary connectors 226 through the lateral leg 20 or the medial leg 22 and into the aperture 224 of the primary connector 222. In some implementations, extending the secondary connector 226 into the aperture 224 of the primary connector 222 includes threadably engaging the secondary connector 226 with the primary connector 222 within the aperture 224.

With reference to FIG. 5, another shelf 18a for use with the furniture unit 10 is shown. The structure, function, and method of manufacturing the shelf 18a may be substantially similar to that of the shelf 18, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The shelf 18a may include the hollow proximal support 214 and a hollow distal support 216a. As illustrated in FIG. 5, the hollow proximal support 214 and the hollow distal support 216a may be disposed on opposite sides of the shelf 18a. In this regard, folding the substrate 46 to form the hollow proximal support 214 may include folding the proximal portion 60 in a counterclockwise direction, and folding the substrate 46 to form the hollow distal support 216a may include folding the distal portion 62 in a counterclockwise direction.

With reference to FIG. 6, another shelf 18b for use with the furniture unit 10 is shown. The structure, function, and method of manufacturing the shelf 18b may be substantially similar to that of the shelf 18, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The shelf 18b may include a hollow support 216b extending from the proximal portion 60 to the distal portion 62 of the substrate 46. In this regard, folding the substrate 46 to form the hollow support 216b may include folding the proximal portion 60 in a counterclockwise direction, or folding the distal portion 62 in a clockwise direction, such that the proximal peripheral surfaces 64, 80, or 94 are disposed adjacent the distal peripheral surfaces 66, 82, or 96.

Figure 7B:
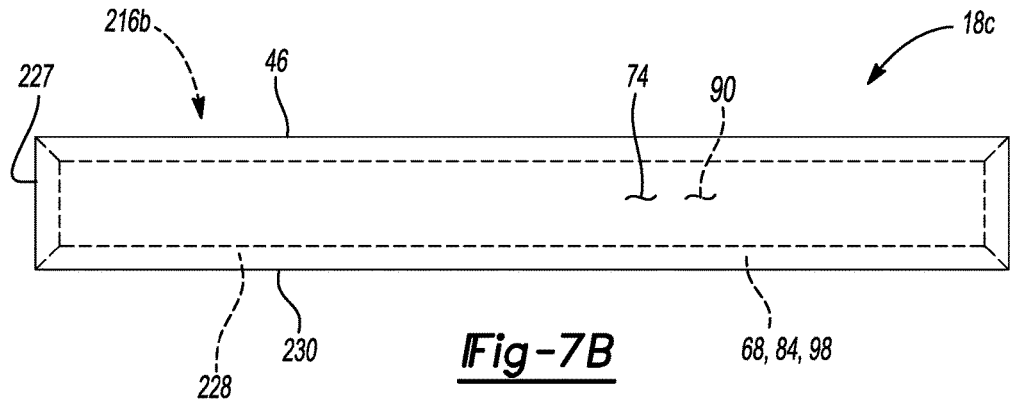
FIG. 7B is an end view of a shelf formed with the substrate of FIG. 7A and for use with the furniture unit of FIG. 1.

With reference to FIGS. 7A and 7B, another shelf 18c (FIG. 7A) formed from the substrate 46, and for use with the assembly 10, is shown. The structure, function, and method of manufacturing the shelf 18c may be substantially similar to that of the shelf 18b, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The substrate 46 of the shelf 18c may include the hollow support 216b extending from the proximal portion 60 to the distal portion 62 of the substrate 46, and a cover 227. The cover 227 may engage a portion 228 of the lateral peripheral surfaces 68, 84, or 98 or a portion 228 of the medial peripheral surfaces 70, 86, or 100. In some implementations, the shelf 18c may have two covers 227; one cover 227 may engage a portion 228 of the lateral peripheral surfaces 68, 84, or 98 and the other cover 227 may engage a portion 228 of the medial peripheral surfaces 70, 86, or 100. In this regard, in these implementations, the shelf 18c may have the appearance of a solid piece (e.g., a solid piece of wood) without any openings. With regard to shelf 18c, the substrate 46 may further include a fold 230 that may be formed in one of the upper and lower laminate layers 50, 52 such that one of the upper surfaces 54, 74, 88 or one of the lower surfaces 56, 76, 90 engages the portion 228 of the lateral peripheral surfaces 68, 84, or 98 or the medial peripheral surfaces 70, 86, or 100.

Figure 8:
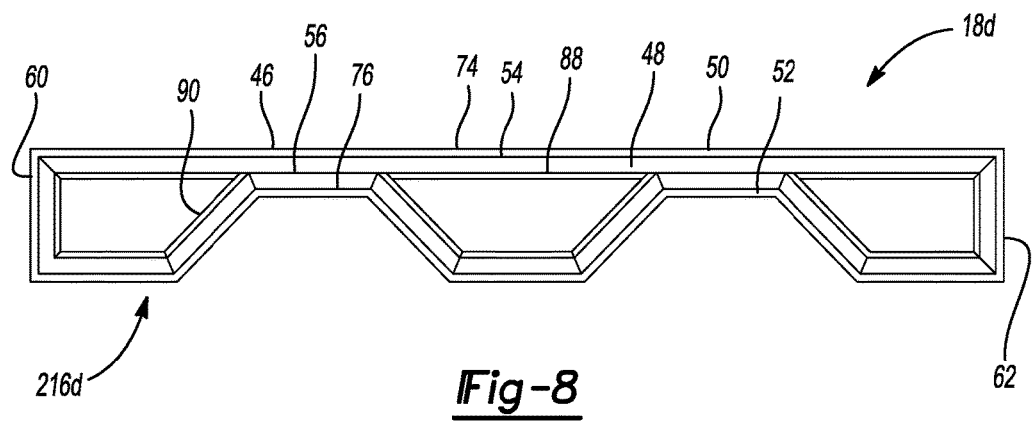
FIG. 8 is an end view of a shelf for use with the furniture unit of FIG. 1.

With reference to FIG. 8, another shelf 18d for use with the furniture unit 10 is shown. The structure, function, and method of manufacturing the shelf 18d may be substantially similar to that of the shelf 18, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "d") are used to identify those features that have been modified.

The shelf 18d may include a support 216d defining a corrugated construct extending from the proximal portion 60 to the distal portion 62 of the substrate 46. In this regard, folding the substrate 46 to form the support 216d may include folding one or more portions of the substrate in a clockwise direction and a counterclockwise direction, such that one of the upper surfaces 54, 74, 88 or one of the lower surfaces 56, 76, 90 engages another one of the upper surfaces 54, 74, 88 or one of the lower surfaces 56, 76, 90. As illustrated in FIG. 8, folding the substrate 46 may include directly engaging various portions of the lower surface 56 of the base layer 48 with various other portions of the lower surface 56 of the base layer 48. In other implementations, folding the substrate 46 may include directly engaging various portions of the upper surface 54 of the base layer 48 with various other portions of the upper surface 54 of the base layer 48

Figure 9:
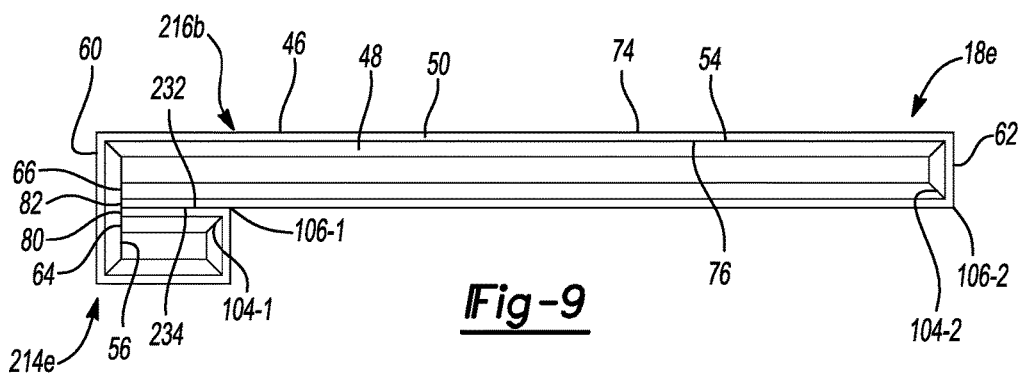
FIG. 9 is an end view of a shelf for use with the furniture unit of FIG. 1.

With reference to FIG. 9, another shelf 18e for use with the furniture unit 10 is shown. The structure, function, and method of manufacturing the shelf 18e may be substantially similar to that of the shelves 18 and 18b, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "e") are used to identify those features that have been modified.

The shelf 18e is a variation of the shelves 18 and 18b shown in FIGS. 4 and 6, including a hollow proximal support 214e and the hollow distal support 216b, and excluding lower laminate layer 52. In particular, the shelf 18e may include the hollow support 216b extending from the proximal portion 60 to the distal portion 62 of the substrate 46. Folding the substrate 46 may include forming the hollow proximal support 214e by folding the proximal portion 60 in a counterclockwise direction, and forming the hollow distal support 216b by folding the substrate 46 in a clockwise direction from the proximal portion 60 to the distal portion 62 such that the proximal peripheral surfaces 64, 80 are disposed adjacent the distal peripheral surfaces 66, 82. In some implementations, the proximal peripheral surfaces 64, 80 and the distal peripheral surfaces 66, 82 engage the lower surface 56 of the base layer 48. In this regard, the upper surface 74 of the upper laminate layer 50 may include a first portion 232 (e.g., a forward portion) extending from a first seam 104-1 to the proximal peripheral surfaces 64, 80, and a second portion 234 (e.g., a rearward portion) extending from a second seam 104-2 to the distal peripheral surfaces 66, 82. The first portion 232 of the upper surface 74 may engage the second portion 234 of the upper surface 74. The substrate 46 of shelf 18e also may include lower laminate layer 52 such that the proximal peripheral surfaces 64, 80, or 94 are disposed adjacent the distal peripheral surfaces 66, 82, or 96; and in some implementations, the proximal peripheral surfaces 64, 80, or 94 and the distal peripheral surfaces 66, 82, or 96 engage the lower surface 90 of the lower laminate layer 52.

The configuration of, and related methods of manufacturing, the furniture unit 10 described herein, including, for example, the various channels 202, and the seams 104-n and folds 106-n formed thereby, can allow a user to easily and efficiently manufacture the shelves 18, 18a, 18b, 18c, 18d, 18e and the furniture unit 10 to have superior strength and durability.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A furniture unit comprising at least one shelf including a substrate having a base layer and a laminate layer, wherein the base layer has an upper surface, a lower surface opposite the upper surface, a proximal peripheral surface extending from the upper surface to the lower surface, a distal peripheral surface opposite the proximal peripheral surface and extending from the upper surface to the lower surface, a first seam, and a second seam spaced apart from the first seam, the first and second seams extending in a direction parallel to the proximal peripheral surface, wherein the laminate layer is disposed on one of the upper surface or the lower surface and includes a channel exposing a portion of the base layer, and wherein the proximal peripheral surface is disposed within the channel and engages the portion of the base layer.

2. The furniture unit of claim 1, wherein at least one of the first seam and the second seam is defined by a first channel wall and a second channel wall.

3. The furniture unit of claim 2, wherein the first channel wall and the second channel wall define a common edge.

4. The furniture unit of claim 2, wherein the first channel wall engages the second channel wall.

5. The furniture unit of claim 1, wherein the first and second seams extend from the upper surface, and wherein the proximal peripheral surface engages the upper surface.

6. The furniture unit of claim 1, wherein the substrate includes a third seam and a fourth seam spaced apart from the third seam, the third and fourth seams extending in a direction parallel to the distal peripheral surface, wherein the distal peripheral surface engages one of the upper surface and the lower surface.

7. The furniture unit of claim 6, wherein the first and second seams extend from the upper surface, and the third and fourth seams extend from the lower surface, and wherein the proximal peripheral surface engages the upper surface and the distal peripheral surface engages the lower surface.

8. The furniture unit of claim 6, wherein the first, second, third, and fourth seams are defined by first, second, third, and fourth channels, respectively, formed in the upper surface, and wherein the proximal and distal peripheral surfaces engage the upper surface.

9. The furniture unit of claim 6, wherein a forward portion of the upper surface engages a rearward portion of the upper surface.

10. The furniture unit of claim 1, wherein the substrate includes a proximal portion and a distal portion opposite the proximal portion, the proximal portion forming a hollow support portion.

11. The furniture unit of claim 10, wherein the hollow support portion defines a polygonal cross section.

12. The furniture unit of claim 11, wherein the polygonal cross section defines a square.

13. The furniture unit of claim 10, wherein the distal portion forms a hollow support portion.

14. The furniture unit of claim 1, wherein the upper surface includes a first portion and a second portion, the first portion extending between the proximal peripheral surface and the first seam, the second portion extending between the first seam and the second seam, and wherein the first portion and the second portion define an angle therebetween.

15. The furniture unit of claim 14, wherein the angle is between about fifteen degrees and about sixty degrees.

16. The furniture unit of claim 14, wherein the angle is equal to ninety degrees.

17. The furniture unit of claim 1, wherein the proximal peripheral surface defines an angle between about fifteen degrees and about sixty degrees relative to the one of the upper surface and the lower surface.

18. The furniture unit of claim 17, wherein the proximal peripheral surface defines an angle substantially equal to ninety degrees relative to the one of the upper surface and the lower surface.

19. The furniture unit of claim 1, wherein the substrate includes a lateral peripheral surface and a medial peripheral surface opposite the lateral peripheral surface, the lateral and medial peripheral surfaces each extending from the upper surface to the lower surface, the first and second seam each extending from the lateral peripheral surface to the medial peripheral surface.

20. The furniture unit of claim 1, wherein at least one of the first seam and the second seam is defined by a primary channel formed in the base layer.

21. The furniture unit of claim 20, wherein the laminate layer includes a first fold and a second fold, the first fold aligned with the first seam, the second fold aligned with the second seam.

22. The furniture unit of claim 20, wherein the laminate layer is a paper material or a polymer material.

23. The furniture unit of claim 22, wherein the base layer is one of a medium-density fiberboard and a particle board.

24. The furniture unit of claim 20, further comprising an adhesive between where the proximal peripheral surface engages the portion of the base layer.

25. The furniture unit of claim 20, wherein the proximal peripheral surface is adhered to the portion of the base layer.

26. The furniture unit of claim 1, further comprising a first lateral leg, a first medial leg, a second lateral leg, and a second medial leg, wherein the at least one shelf includes a first shelf and a second shelf, the first lateral leg and the first medial leg supporting the first shelf, the second lateral leg and the second medial leg supporting the second shelf.

27. The furniture unit of claim 26, wherein the first lateral leg is removably coupled to the second lateral leg, and the first medial leg is removably coupled to the second medial leg.

28. The furniture unit of claim 26, further comprising a connector removably coupled to the first lateral leg and to the second lateral leg.

29. The furniture unit of claim 1, further comprising an adhesive between where the proximal peripheral surface engages the portion of the base layer.

30. The furniture unit of claim 29, wherein the adhesive includes a glue.

31. The furniture unit of claim 1, wherein the proximal peripheral surface is coupled to the portion of the base layer.

32. The furniture unit of claim 31, wherein the proximal peripheral surface is adhered to the portion of the base layer.

33. A method of manufacturing a furniture unit from a substrate having a base layer and at least one laminate layer, wherein the base layer has an upper surface, a lower surface, and a peripheral surface extending from the upper surface to the lower surface, the method comprising:
    forming a first primary channel and a second primary channel in the base layer adjacent a proximal end of the substrate;
    removing a portion of the at least one laminate layer to form a secondary channel and to expose a portion of the base layer;
    folding the substrate in a first direction at the first and second primary channels to form a hollow proximal support;
    placing the peripheral surface within the secondary channel; and
    engaging the peripheral surface with the portion of the base layer.

34. The method of claim 33, further comprising:
    forming a third primary channel and a fourth primary channel adjacent a distal end of the substrate; and
    folding the substrate in the first direction at the third and fourth primary channels to form a hollow distal support.

35. The method of claim 34, wherein the first and second primary channels are formed in the upper surface of the substrate, the third and fourth primary channels are formed in the lower surface of the substrate, the lower surface of the substrate being opposite the upper surface of the substrate.

36. The method of claim 34, wherein the first, second, third, and fourth primary channels are formed in the upper surface of the substrate.

37. The method of claim 34, wherein the folding step results in a first fold and a second fold formed in the at least one laminate layer.

38. The method of claim 37, wherein the first fold is aligned with the first primary channel, and the second fold is aligned with the second primary channel.

39. The method of claim 34, wherein the at least one laminate layer includes an upper laminate layer disposed on an upper surface of the base layer, and a lower laminate layer disposed on a lower surface of the base layer, the lower surface of the base layer being opposite the upper surface of the base layer, and wherein the first and second primary channels extend through the upper laminate layer and the third and fourth primary channels extend through the lower laminate layer.

40. The method of claim 33, wherein forming the first and second primary channels includes miter cutting through a portion of the substrate.

41. The method of claim 33, further comprising:
    forming a third primary channel and a fourth primary channel in the substrate; and
    folding the substrate in a second direction at the third and fourth primary channels to form a hollow distal support, the second direction being opposite to the first direction.

42. The method of claim 41, wherein the first direction is counterclockwise and the second direction is clockwise.

43. The method of claim 33, further comprising applying an adhesive between where the peripheral surface engages the portion of the base layer.

44. The method of claim 43, wherein the adhesive includes a glue.

45. The method of claim 33, wherein engaging the peripheral surface with the portion of the base layer includes coupling the peripheral surface to the portion of the base layer.

46. The method of claim 45, wherein the coupling includes adhering the peripheral surface to the portion of the base layer.

* * * * *